Patented Sept. 27, 1927.

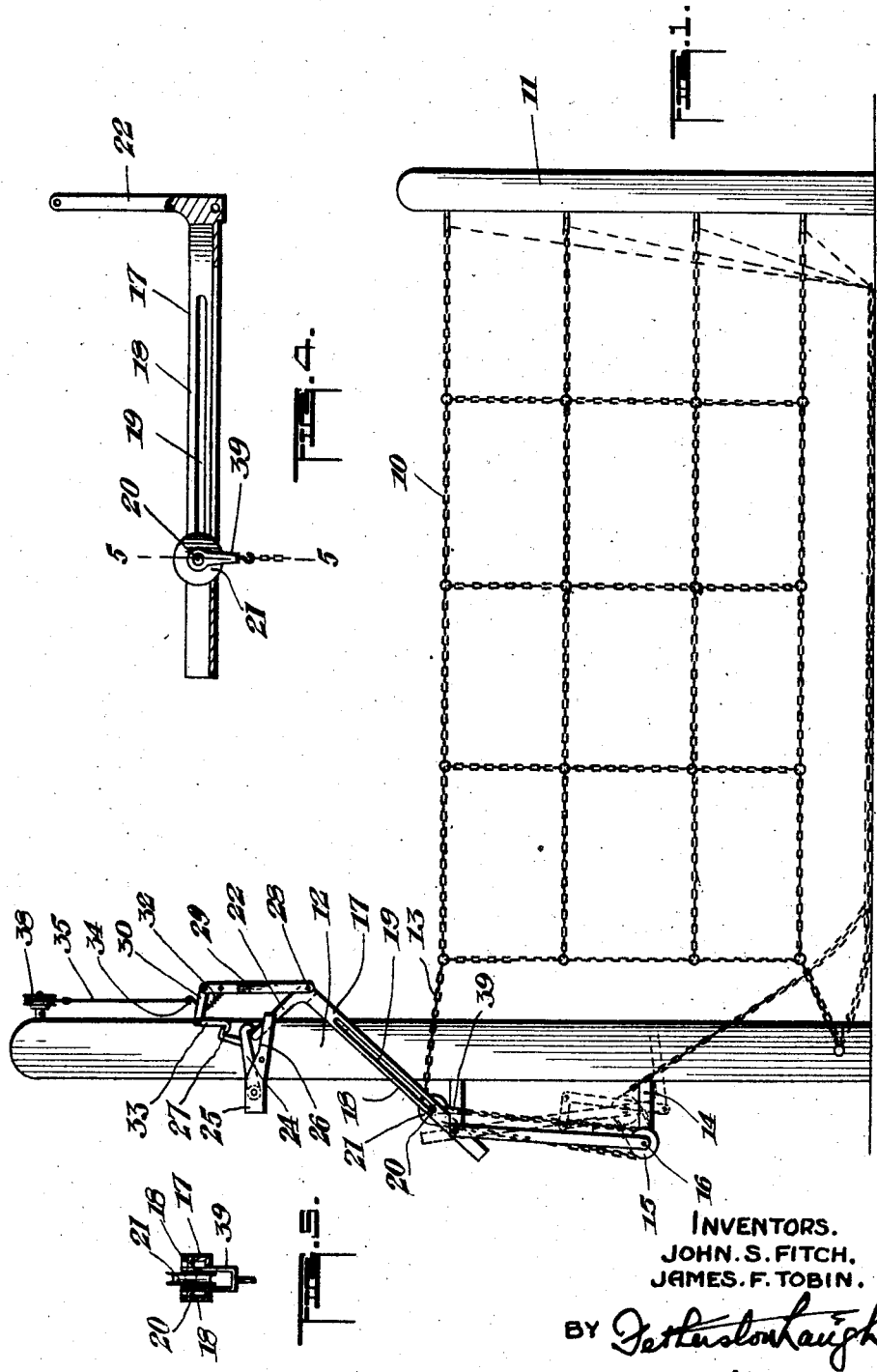

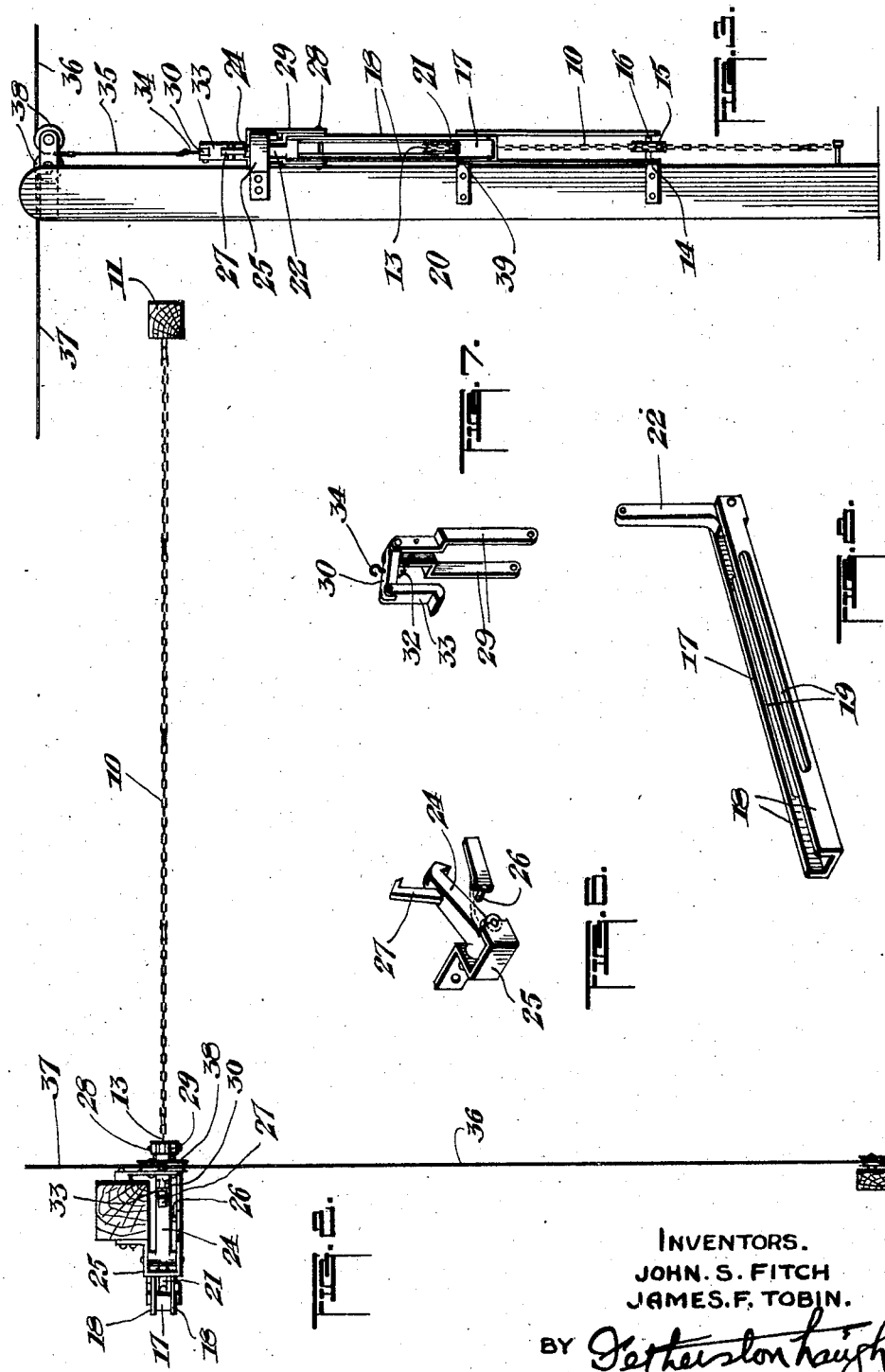

1,643,297

UNITED STATES PATENT OFFICE.

JOHN SURDAN FITCH AND JAMES FRANCIS TOBIN, OF EVARTS, ALBERTA, CANADA.

GATE.

Application filed July 6, 1926. Serial No. 120,794.

This invention relates to improvements in gates and more particularly to that class of gates known as collapsible and the objects of the invention are to provide a simple and durably constructed device for operating collapsible gates from a distance, to open them and cause them to collapse, and to close them causing them to be built up.

A further object is the provision of a gate of this description that will efficiently perform the functions required of it and, at the same time, be manufactured and placed on the market at a reasonable price.

A still further object is to provide means of opening gates of this description that can be operated by the driver of a vehicle from a distance without dismounting from the vehicle and whereby on account of the simplicity of action and comparatively little effort required, the tendency to pass on and leave the gate open is reduced to a minimum.

With these and other objects, hereinafter more fully referred to, in view, the invention consists essentially in a combination, with a gate of flexible material, suitably suspended, and provided with an extension, and having pulleys intermediately arranged for the extension to travel over, of mechanism operable from a distance for tensioning the extension on the pulleys to close the gate and to release the tension on the pulleys to open the gate.

Referring now to the drawings in which like characters of reference indicate corresponding parts in each figure, Figure 1 is a front elevation of our improved gate, Figure 2 is a plan view showing the top of the gate and the supporting posts and the means for operating the gate from a distance, Figure 3 is an end elevation of the operating post with mechanism mounted thereon, Figure 4 is a longitudinal section of the elongated link carrying a pulley, Figure 5 is a section on the line 5—5 of Figure 4, Figure 6 is a perspective detail of one of the lifting hooks, Figure 7 is a detail of the clevice of loop for the link member, and Figure 8 is a perspective detail of the channel-formed and slotted link.

Referring now more particularly to the drawings, in which a substantially preferred form of our invention is illustrated, 10 designates a gate of flexible material such as wire or chain, and here shown as of chain or cable, arranged in any preferred manner.

11 is one of the gate posts upon which the gate strands are fixedly connected in any suitable way, while 12 is the other gate post on which, as hereinafter more fully described, is mounted the opening and closing mechanism.

The gate structure 10 is provided with a flexible extension 13 at the top in the form of a chain or cable while 14 is a bracket mounted on the post 12 and on that side of the post remote from the gate. On the lower end of this bracket a pulley 15 is mounted, adapted to revolve freely upon an axis 16 carried by the bracket. Pivotally attached to the upper extremity of the bracket is an elongated link 17 formed with sides 18, and provided with partially and longitudinally extending slots 19 therein. In these slots, on a slidably mounted pin 20, free to slide upwardly and downwardly therein, is a pulley 21. The slots 19 are arranged in the sides 18 of the link 17 for the purpose of limiting the travel of the pulley 21. To the upper extremity of the link 17 is an arm 22 (see Figure 8) rigidly fixed thereon at any desired angle and adapted to engage with a catch hook 24 when the gate is closed. This catch hook is pivotally mounted in a supporting bracket 25, attached to the post 12, its operation upwardly and downwardly being limited to the required extent by means of stops 26 in the bracket 25. Rigidly attached to, and projecting between, the catch hook is a lift hook 27 (see Figure 6) adapted to raise the catch hook 24 when it is desired to release the member 22 to open the gate.

At the upper extremity of the link 17, and pivotally mounted thereon at 28, is a loop member 29 adapted to permit therethrough free passage of the arm 22. Pivotally attached to the upper extremity of the loop 29 is a bar 30 so constructed at its pivotal connection that its radius of action is confined to desired limits. The movement of this bar 30 is also partially controlled by a coil spring 32. On the other end of the bar 30 is pivotally mounted, in suspended position, a lift hook 33 to detachably engage with the lift hook 27. A hook 34 is formed on the bar 30 to which is connected an operating cable 35 which extends over a short distance where it is forked to operating units 36 and 37 (see Figure 2), passing over pulleys 38, and extending horizontally at right angles to the gate to any suitable position by the side of the roadway or the like, where the free ends of the ropes are suspended ready for use to open or close the gates. The extension 13 passes over the pulleys 21 and 15 and extends from the upper corner of the gate, over the pulley 21, then downwardly and beneath the fixed pulley 15, and then upwardly and is secured to a link or hook 39 suspended from the pin 20 on the slidably mounted pulley 21.

In operation for opening the gate a short quick pull is given to the cable. This is followed by immediate release of tension in the cable and also results in lifting the arm 30 through a short arc. The hook 33 being suspended in the free extremity of said arm is also raised for a short distance to release through the hook 27 the catch or hook 24 which retains the gate in closed position by engagement with the upper extremity of the arm 22. The hook 24 cannot instantly re-engage the arm 22 on release of tension in the cable for the reason that the combined weight of the gate transmitted through the pulley 21 by means of the extension chain together with the weight and downward leverage of the link 17 produces a radial movement of the extremity of the arm 22 which enables it to move clear of the hook 24 before it can again descend upon it, even though the hook 24 only traverses a very short arc in its descent. The collapse of the gate is instantaneous on the release of the arm 22 by the raising of the hook 24.

In closing the gate the link 17 on which the travelling pulley is carried is raised by the tensioning of the cable until the extremity of the arm 22 automatically engages with the catch or hook 24, the operator being immediately apprised of such engagement by aural and occular observation, and also by the change of tension in the cable.

While the operation of the gate is in progress, the pull exerted by the cable has a tendency to straighten out the arm 30, causing it to assume an almost vertical position. The hook 33 which is free to hang vertically from the arm 30 when the gate is nearly closed is thus carried upwardly in a vertical line laterally removed (though in the same vertical plane) from a vertical line which is tangential to the outer extremity of the hook 27.

After the gate is closed the slackening of the operating cable permits the arm 30 to be drawn downwardly by the recoil of the springs 32 upwardly. The suspended hook assumes a position below the hook 27 ready for the next opening of the gate.

The assembly consisting of the members 29, 30 and 33 is retained in position ready for opening the gate by the counterbalancing action of the weight of the cable and the friction of the pulleys over which the cable passes. The spring connected members 29 and 30 overcome the tendency of the arm 30 to react to the slight upward pull exerted upon it by the slackened cable. The hooks 24 and 33 are so formed at their pivotal heels that their hooked extremities will not assume positions lower than those predetermined for the purpose of each. In the case of the hook 33 the "low" position is just below the hook 27 and in the case of the hook 24 the "low" position is determined by the altitude at which the extremity of the arm 22 will conveniently engage with the hook 24 when the gate has been raised to the closed position.

As many changes could be made in the above construction and many apparently widely different embodiments of our invention, within the scope of the claims, constructed without departing from the spirit or scope thereof, it is intended that all matter contained in the present specification and accompanying drawings shall be interpreted in an illustrative and not in a limiting sense.

What we claim as our invention is:

1. In a device of the character described, the combination, with a flexible gate member provided with an extension, of a supporting post, a pulley rigidly mounted on the post and adapted to engage with the extension, a link member formed with engaging means at one end and pivotally mounted at the other end, a second pulley slidably mounted in the link member and adapted to engage with the extension, a pivotally mounted hook member adapted to detachably engage with the link member engaging means, a second link pivotally connected to the first-mentioned link and having pivotally mounted thereon a hooked-carrying arm, and means formed on the pivotally mounted hook member adapted to detachably engage with said hooked arm, a cable, operable from a distance, connected to said arm whereby on the cable being pulled the hooked arm is raised to disengage the link from the pivotally mounted hook member permitting the gate in engagement with the pulley in said link to drop into open position and whereby on the cable being further operated the pulley carrying link connected to the gate is raised to re-engage with the pivotally mounted hook member and retain the gate in built-up position.

2. In a gate of the character described, the combination, with gate posts, and a gate member of flexible material rigidly connected to one of said posts, of a supporting bracket on the other gate post, a pulley rigidly mounted in the bracket, a link swingingly mounted on the bracket and having a slot therein, a pulley slidably mounted in the link, a hook member adjacent the link member and means formed on the link adapted to detachably engage with said hook member, an auxiliary hook on the hook member and a hooked arm pivotally mounted on the link adapted to engage and disengage with the auxiliary hook, cable means connected to the hooked arm adapted on being tensioned to release the hooked member and permit the pulley-carrying link to drop, a flexible extension for the gate adapted to travel on the pulleys and means carried by the link for anchoring the end of said extension.

3. A flexible gate of the character described, and in combination, with a fixed pulley adapted to engage an extension on the gate, said extension, a swingingly mounted and slotted link member pivotally associated with the gate extension and provided with a slidably operable pulley, cable operable mechanism for detachably suspending said link and retaining it in suspended position.

In witness whereof we have hereunto set our hands.

JOHN SURDAN FITCH.
JAMES FRANCIS TOBIN.